(12) United States Patent
Kikuchi

(10) Patent No.: US 8,674,659 B2
(45) Date of Patent: Mar. 18, 2014

(54) CHARGE CONTROL DEVICE AND VEHICLE EQUIPPED WITH THE SAME

(75) Inventor: Yoshiaki Kikuchi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 492 days.

(21) Appl. No.: 12/995,240

(22) PCT Filed: Jun. 2, 2009

(86) PCT No.: PCT/IB2009/005825
§ 371 (c)(1),
(2), (4) Date: Nov. 30, 2010

(87) PCT Pub. No.: WO2009/147505
PCT Pub. Date: Dec. 10, 2009

(65) Prior Publication Data
US 2011/0115435 A1      May 19, 2011

(30) Foreign Application Priority Data
Jun. 4, 2008   (JP) .................................. 2008-147253

(51) Int. Cl.
*H02J 7/00*        (2006.01)
(52) U.S. Cl.
USPC ....................................................... 320/118
(58) Field of Classification Search
USPC ....................................................... 320/118
See application file for complete search history.

(56) References Cited

U.S. PATENT DOCUMENTS

| | | | |
|---|---|---|---|
| 5,625,272 A | 4/1997 | Takahashi | |
| 5,886,502 A | 3/1999 | Higashijima | |
| 6,043,628 A * | 3/2000 | Perelle et al. | 320/119 |
| 6,133,707 A * | 10/2000 | Kikuchi et al. | 320/104 |
| 2002/0003417 A1* | 1/2002 | Bito et al. | 320/152 |
| 2002/0070709 A1* | 6/2002 | Small et al. | 320/150 |
| 2003/0231005 A1 | 12/2003 | Kohama et al. | |

FOREIGN PATENT DOCUMENTS

| | | |
|---|---|---|
| EP | 0 967 108 A1 | 12/1999 |
| JP | 08-140206 A | 5/1996 |
| JP | 2006-174597 A | 6/2006 |
| JP | 2006-210244 A | 8/2006 |
| WO | 2007/093882 A2 | 8/2007 |
| WO | 2008/053969 A1 | 5/2008 |

OTHER PUBLICATIONS

International Search Report and Written Opinion for corresponding International Patent Application No. PCT/IB2009/005825 mailed Jul. 28, 2009.

* cited by examiner

*Primary Examiner* — Arun Williams
(74) *Attorney, Agent, or Firm* — Sughrue Mion, PLLC

(57) ABSTRACT

A charge control device (40A, 40B, 50) is provided that controls charging and discharging of a storage battery (10) in which a plurality of storage blocks (12A to 12N), each including a plurality of cells (11), are connected in series. The charge control device includes voltage sensors (40A, 40B) that detect voltage values of the storage blocks (12A, 12B), respectively, wherein a charge and discharge process is performed in which a charge mode, in which the storage battery is charged, and a discharge mode, in which the storage battery is discharged, are alternately selected, and in which one of the charge mode and the discharge mode is switched to the other mode based on the amount of difference between the voltage values detected by the voltage sensors (40A, 40B).

18 Claims, 6 Drawing Sheets

CHARGE CONTROL DEVICE AND VEHICLE EQUIPPED WITH THE SAME

BACKGROUND OF THE INVENTION

1. Field of the Invention

The invention relates to a charge control device that controls charging and discharging of a storage battery in which a plurality of storage blocks, each including a plurality of storage elements, are connected in series.

2. Description of the Related Art

As a driving battery or an auxiliary battery for pure electric vehicles, hybrid vehicles, and fuel cell vehicles, a storage battery is available in which a plurality of storage elements are connected in series. In general, a storage battery, such as a secondary battery, does not output sufficient power when the temperature thereof is low. Thus, methods of performing forced continuous charging and discharging to increase the temperature of storage batteries have already been available.

Japanese Patent Application Publication No. 2006-174597 (JP-A-2006-174597) describes a method of rapidly recovering the capacity of a battery by appropriately controlling charging and discharging according to the driving conditions of a vehicle and the amount of electricity remaining in the battery, and accelerating the increase in temperature with the use of the internal heat generation in the battery.

However, the internal resistance of each storage element varies depending on the temperature of the storage element. Specifically, the temperature and the internal resistance of a storage element have a correlation with each other, and as shown in FIG. 6, the internal resistance increases as the temperature of the storage element decreases.

The value of the current flowing through each of the storage elements is the same, and therefore, the amount of voltage reduction during continuous charging or discharging is large in the low-temperature storage element. When the voltage level of a storage element is less than a predetermined value, deterioration progresses, which can reduce the lifetime of the storage battery.

It is possible to identify the storage element in which the amount of voltage reduction is large by providing each of the storage elements with a voltage sensor. However, when this method is used, the number of voltage sensors is large and costs therefore increase.

SUMMARY OF THE INVENTION

The invention provides a charge control device that alternately performs charging and discharging of a storage battery while suppressing deterioration of the storage battery.

A first aspect of the invention is a charge control device that controls charging and discharging of a storage battery in which a plurality of storage blocks, each including a plurality of storage elements, are connected in series. The charge control device includes a first voltage sensor and a second voltage sensor that detect a voltage value of a first storage block and a voltage value of a second storage block, respectively, the first and second storage blocks included in the plurality of storage blocks. When a charge and discharge process is performed in which a charge mode, in which the storage battery is charged, and a discharge mode, in which the storage battery is discharged, are alternately selected, one of the charge mode and the discharge mode is switched to the other mode based on the amount of difference between the voltage values detected by the first and second voltage sensors.

With the configuration of the first aspect, it is possible to alternately perform charging and discharging of the storage battery while suppressing deterioration of the storage battery. In addition, it is possible to reduce the number of voltage sensors to reduce costs.

The charge control device according to the first aspect may be configured such that, in the charge and discharge process, when the difference between the voltage values detected by the first and second voltage sensors is greater than a predetermined value, the one of the charge mode and the discharge mode is switched to the other mode. The charge control device according to the first aspect may be configured such that, in the charge and discharge process, when the difference between the voltage values detected by the first and second voltage sensors increases, the one of the charge mode and the discharge mode is switched to the other mode. These are intended to clarify the meaning of the following phrase in the first aspect: "based on the amount of difference between the voltage values detected by the first and second voltage sensors".

In the charge control device according to the first aspect, the charge and discharge process may be performed when the temperature of the storage battery is equal to or lower than a predetermined temperature. Specifically, the charge and discharge process is performed to increase the temperature of the storage battery. In this way, it is possible to increase the power output from the storage battery.

In the charge control device according to the first aspect, the one of the charge mode and the discharge mode may be the discharge mode and the other mode may be the charge mode. Voltage reduction is caused especially during the discharge mode (continuous discharging), and therefore, with the invention, it is possible to effectively suppress deterioration of the storage battery.

The charge control device according to the first aspect may be configured such that, in the charge and discharge process, when in the charge mode, the storage battery is charged by the amount corresponding to the amount of electricity discharged from the storage battery in the discharge mode. With this configuration, it is possible to prevent extreme variation of the amount of electricity stored in the battery pack.

In the charge control device according to the first aspect, the charge and discharge process may be performed when the amount of electricity stored in the storage battery is within a predetermined range, the center of which is a target electricity storage amount that is a target value of the amount of electricity stored in the battery pack. With this configuration, it is possible to keep the amount of electricity stored in the storage battery within the predetermined range, the center of which is the target electricity storage amount.

The charge control device according to the first aspect may be configured such that, before performing the charge and discharge process, when the amount of electricity stored in the battery pack is out of the predetermined range, the amount of electricity stored in the battery pack is varied so as to fall within the predetermined range by charging or discharging the storage battery. With this configuration, it is possible to perform the charge and discharge process after varying the amount of electricity stored in the storage battery so as to fall within the predetermined range.

In the charge control device according to the first aspect, the first and second storage blocks may be next to each other. By using, as the basis, the voltage difference between the storage blocks that are less prone to have a temperature difference, it is possible to effectively prevent erroneous detection of the voltage reduction in a storage element.

In the charge control device according to the first aspect, a secondary battery may be used as the storage battery.

A second aspect of the invention is a vehicle equipped with the charge control device according to the first aspect.

A third aspect of the invention is a storage battery control method, in which charging and discharging of a storage battery in which a plurality of storage blocks, each including a plurality of storage elements, are connected in series are controlled, the storage battery control method including: detecting a voltage value of a first storage block included in the plurality of storage blocks; detecting a voltage value of a second storage block included in the plurality of storage blocks; and performing a charge and discharge process in which a charge mode, in which the storage battery is charged, and a discharge mode, in which the storage battery is discharged, are alternately selected, wherein one of the charge mode and the discharge mode is switched to the other mode based on the amount of difference between the voltage values detected by the first and second voltage sensors.

With the invention, it is possible to provide, at relatively lower cost, a charge control device that alternately performs charging and discharging of a storage battery while suppressing deterioration of the storage battery.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below.

Figure 1:
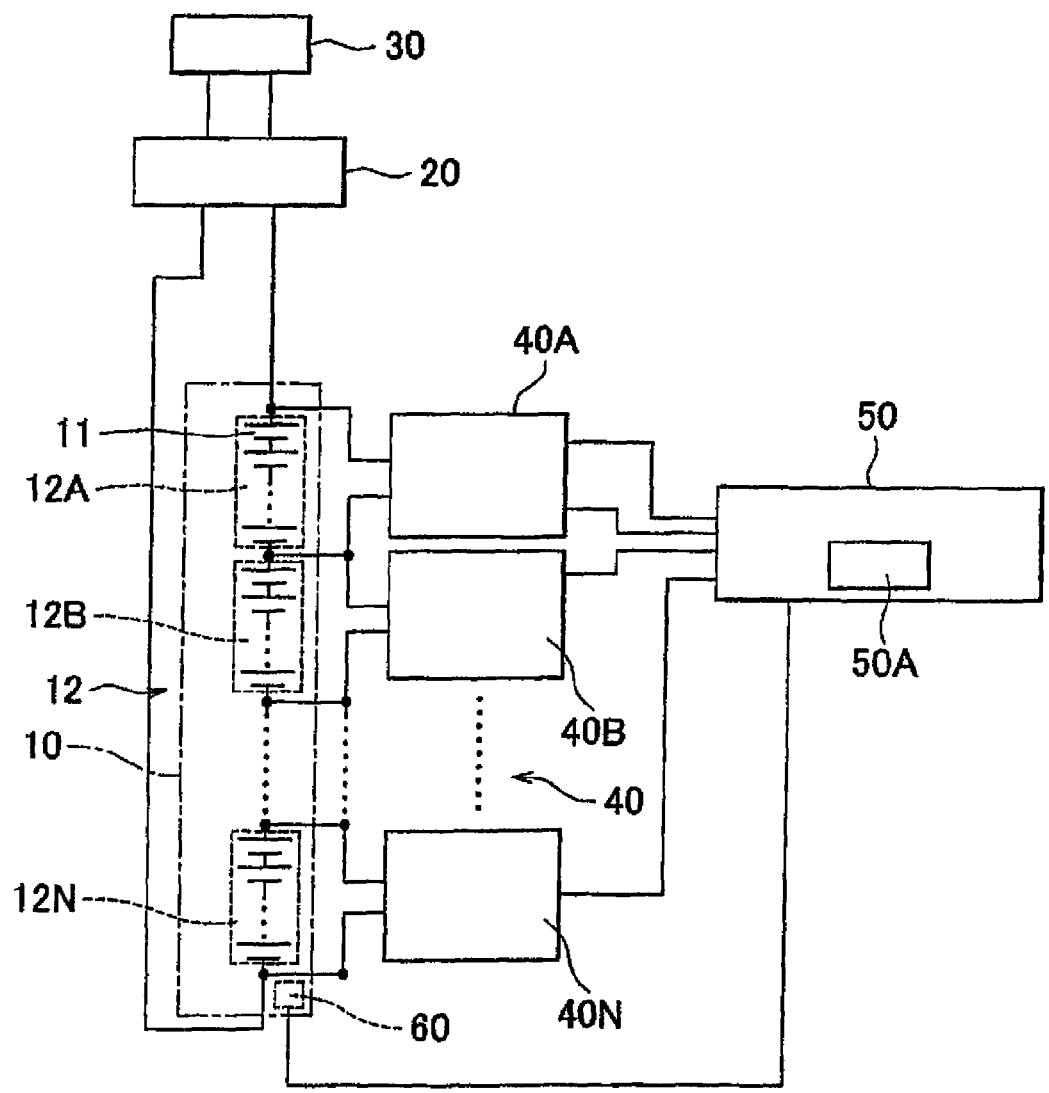
FIG. 1 is a block diagram of a charge control device.

A charge control device, which is a first embodiment of the invention, will be described with reference to drawings. FIG. 1 is a block diagram showing a circuit configuration of the charge control device of this embodiment.

In FIG. 1, a battery pack (storage battery) 10 has a construction in which a plurality of battery blocks (storage blocks) 12 are electrically connected in series. In this embodiment, fourteen battery blocks 12A to 12N are connected in series. The battery blocks 12A to 12N are arranged in this order. Each of the battery blocks 12A to 12N is made up of a plurality of cells (storage elements) 11. These cells 11 are electrically connected in series. The number of cells 11 included in each of the battery blocks 12A to 12N is the same and is twelve in this embodiment. The number of battery blocks 12 and the number of cells 11 may be changed as appropriate according to the purpose of the battery pack 10.

An inverter 20 is electrically connected to the end positive terminal and the end negative terminal of the battery pack 10 through wiring. The inverter 20 is electrically connected to a motor 30 and drives the motor 30 with the use of the power output from the battery pack 10.

The battery pack 10 of this embodiment is mounted on a vehicle (not shown) and drives the motor 30, thereby driving the vehicle. During braking of the vehicle, the electrical power generated by using a motor generator (not shown), which serves as an electric generator, can be used to charge the battery pack 10. Examples of the above-mentioned vehicle include hybrid vehicles and pure electric vehicles. A hybrid vehicle is a vehicle provided with, in addition to the battery pack 10, another power source, such as an internal combustion engine or a fuel cell for driving the vehicle. A pure electric vehicle is a vehicle that is driven by using the power output from the battery pack 10 alone.

Secondary batteries, such as nickel-hydrogen batteries or lithium-ion batteries, can be used as the cells 11 constituting the battery pack 10. Instead of the secondary battery, an electric double-layer capacitor can be used, which is a storage element.

Voltage sensors 40A to 40N are connected to the battery blocks 12A to 12N, respectively. The voltage sensors 40A to 40N detect the voltage of the corresponding battery blocks 12A to 12N (hereinafter referred to as the "block voltage") and output the results of the detection to a controller 50. The controller 50 performs control for increasing the temperature of the battery pack 10, which will be described later, based on the amount of voltage difference between the adjacent battery blocks 12A and 12B, which are a first storage block and a second storage block, respectively. The voltage sensors 40A and 40B function as the first and second voltage sensors.

The battery pack 10 is provided with a temperature sensor 60 (thermistor, for example). The temperature sensor 60 is connected to the controller 50. The controller 50 continuously monitors the temperature of the battery pack 10 based on the temperature data output from the temperature sensor 60. The controller 50 performs temperature increase control for the battery pack 10 when the temperature of the battery pack 10 is lower than a predetermined temperature. The temperature increase control herein means forced charging and discharging of the battery pack 10. It is possible to increase the temperature of the battery pack 10 by forcibly charging and discharging the battery pack 10. In this way, it is possible to increase the power output from the battery pack 10.

The predetermined temperature for the battery pack 10 can be appropriately set in accordance with the kind of the cell 11 in view of the aim of obtaining the power output from the battery corresponding to the required power. When a lithium ion battery is used as the cell 11, for example, the predetermined temperature for the battery pack 10 may be −10° C.

When the battery pack 10 is continuously charged and discharged as described above, the lower the temperature of a cell 11 is, the greater the voltage reduction in a lower temperature cell 11 is, and as a result, the deterioration of the battery pack 10 progresses. The present inventor has found that the difference in the block voltage between a battery block 12 including a cell 11 in which the voltage reduction is large and another battery block 12 including a cell 11 in which the voltage reduction is small, is large. Thus, when the difference in the block voltage is equal to or greater than a predetermined level in the temperature increase control, the operation of the battery pack 10 is switched from discharge to charge or from charge to discharge to suppress the deterioration of the battery pack 10.

In this embodiment, depending on the difference in the block voltage between the adjacent battery blocks 12A and 12B, the operation of the battery pack 10 is switched from discharge to charge or from charge to discharge. Because, in general, the difference in temperature between the adjacent battery blocks 12 is small, it is possible to effectively prevent the erroneous detection of the voltage reduction in the cells 11. However, the temperature increase control for the battery pack 10 may be performed depending on the difference in the block voltage between the battery blocks 12 that are not adjacent, or next, to each other (the battery blocks 12A and 12C, for example).

The controller 50 has a memory 50A, and the variation of the amount of electricity stored (hereinafter referred to as SOC (state of charge)) that is used when the temperature increase control for the battery pack 10 is performed as described later, that is, ΔSOC, is stored in the memory 50A. While, in this embodiment, the memory 50A is provided in the controller 50, the memory 50A may be provided separately from the controller 50. The controller 50 and the voltage sensors 40A and 40B function as the charge control device.

The controller 50 controls charging and discharging of the battery pack 10 so that the temperature increase control is performed within a predetermined range the center of which is the target electricity storage amount that is the target value of the amount of electricity stored in the battery pack 10. In this embodiment, the target electricity storage amount and the lower and upper limit values of the predetermined range are set to 60%, 55%, and 65%, respectively. These values may be appropriately changed in accordance with, for example, the purpose of the battery pack 10.

An example of the method of detecting the voltage reduction in each of the battery blocks 12 is a method, in which a normal voltage of each of the battery block 12 is stored in the memory 50A, the normal voltage read out of the memory 50A and a block voltage are compared, and when the difference is equal to or greater than a predetermined value, the battery pack 10 is switched from a discharge mode to a charge mode or from the charge mode to the discharge mode. In this method, however, the normal voltage of each of the battery blocks 12 varies depending on the condition in which the battery is used, and therefore, many normal voltage values corresponding to the use condition have to be stored in the memory 50A. Thus, the temperature increase control becomes complicated and costs increase. On the other hand, according to the embodiment, it is possible to perform the temperature increase control with a more simple method while reducing costs.

Figure 2:
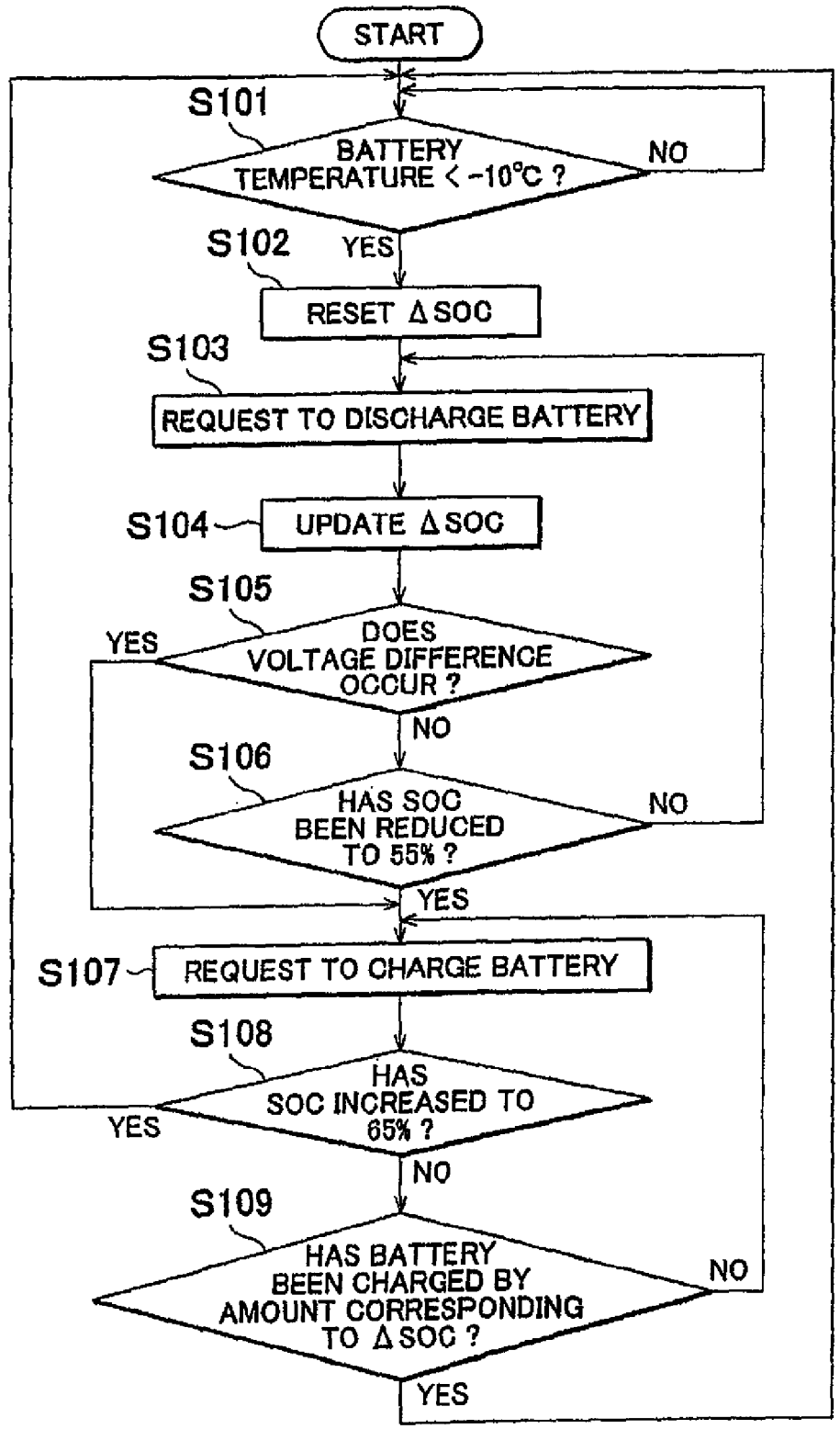
FIG. 2 is a flow chart of temperature increase control.

Next, temperature increase control for the battery pack 10 will be specifically described with reference to FIG. 2. FIG. 2 is a flow chart showing a procedure for temperature increase control for the battery pack 10. The following temperature increase control is performed by the controller 50.

In step S101, which is abbreviated as "S101" in the drawing, it is determined whether the temperature of the battery pack 10 is lower than −10° C. based on the temperature data output from the temperature sensor 60. When it is determined in step S101 that the temperature of the battery pack 10 is lower than −10° C., the process proceeds to step S102.

In step S102, the value of ΔSOC stored in the memory 50A in the controller 50 is reset. Note that it is assumed that the value of ΔSOC that was stored in the memory 50A when the preceding temperature increase control was performed is stored in the memory 50A.

In step S103, it is requested to discharge the battery pack 10. The amount of discharge from the battery pack 10 is monitored by the controller 50. In step S104, the value of ΔSOC immediately after discharging is stored in the memory 50A. The amount of discharge from the battery pack 10 since the start of the temperature increase control is ΔSOC. In other words, the amount of reduction in the amount of electricity stored in the battery pack 10 during the discharge mode is ΔSOC.

In step S105, the difference in the block voltage between the battery blocks 12A and 12B is calculated based on the signals output from the voltage sensors 40A and 40B, and it is determined whether the difference in the block voltage is greater than 0.2 V (predetermined value). When the difference in the block voltage is greater than 0.2 V, the discharging of the battery pack 10 is stopped and the process proceeds to step S107. While, in this embodiment, the difference in the block voltage at which the battery pack 10 is switched is set to 0.2 V, this can be appropriately changed depending on the battery block(s) 12 that is the subject of the comparison and on the condition in which the battery pack 10 is used. In step S107, the battery pack 10 is switched from the discharge mode to the charge mode.

In this way, when the difference in the block voltage between the battery blocks 12A and 12B is greater than 0.2 V, the discharging of the battery pack 10 is stopped, whereby it is possible to suppress the occurrence of an excessive voltage reduction in a low-temperature cell. In this way, it is possible to suppress the deterioration of the battery pack 10.

In addition, because it is possible to estimate the voltage reduction based on the amount of difference in the block voltage between the battery blocks 12A and 12B, it becomes unnecessary to provide each of the cells 11 with a voltage sensor individually. Thus, it is possible to reduce costs.

When it is determined in step S105 that the difference in the block voltage between the battery blocks 12A and 12B is equal to or lower than 0.2 V, the process proceeds to step S106. In step S106, it is determined whether SOC of the battery pack 10 is reduced to 55%. When it is determined in step S106 that SOC of the battery pack 10 is reduced to 55%, the process proceeds to step S107, and the battery pack 10 is switched from the discharge mode to the charge mode.

When it is determined in step S106 that SOC of the battery pack 10 is not reduced to 55%, the process returns to step S103 and the discharge mode continues. When the difference in the block voltage between the battery blocks 12A and 12B is equal to or lower than 0.2 V, excessive voltage reduction does not occur even when the discharge mode continues. Thus, it is possible to increase the temperature of the battery pack 10 while suppressing the deterioration of the battery pack 10. When the process returns from step S106 to step S103, ΔSOC is updated in step S104.

When the battery pack 10 is switched to the charge mode in step S107, the process proceeds to step S108. In step S108, it is determined whether SOC of the battery pack 10 is increased to 65%. When it is determined in step S108 that SOC of the battery pack 10 is increased to 65%, the process returns to step S101. In this way, this embodiment is configured so that the block voltage difference is not detected during charge mode (continuous charging) but detected only during the discharge mode (continuous discharging). This is because reduction in voltage is caused especially during the discharge mode. In this way, it is possible to simplify the temperature increase control for the battery pack 10.

When it is determined in step S108 that SOC of the battery pack 10 is not increased to 65%, the process proceeds to step S109. In step S109, ΔSOC stored in the memory 50A is read out, and it is determined whether the charging, the amount of which corresponds to ΔSOC, has been performed. When it is determined that the charging, the amount of which corresponds to ΔSOC, has not been performed, the process proceeds to step S107 and the charge mode in which the battery pack 10 is charged continues. When it is determined that the charging, the amount of which corresponds to ΔSOC, has been performed, the process returns to step S101.

As described above, in this embodiment, the process is performed so that when the battery pack 10 is switched from the discharge mode to the charge mode, the charging, the amount of which corresponds to the discharged ΔSOC, is performed. Thus, it is possible to suppress excessive variation of SOC of the battery pack 10 during the temperature increase control.

With regard to the flow chart shown in FIG. 2, the temperature increase control may be stopped immediately after the temperature of the battery pack 10 is increased to a temperature higher than −10° C.

Figure 3:
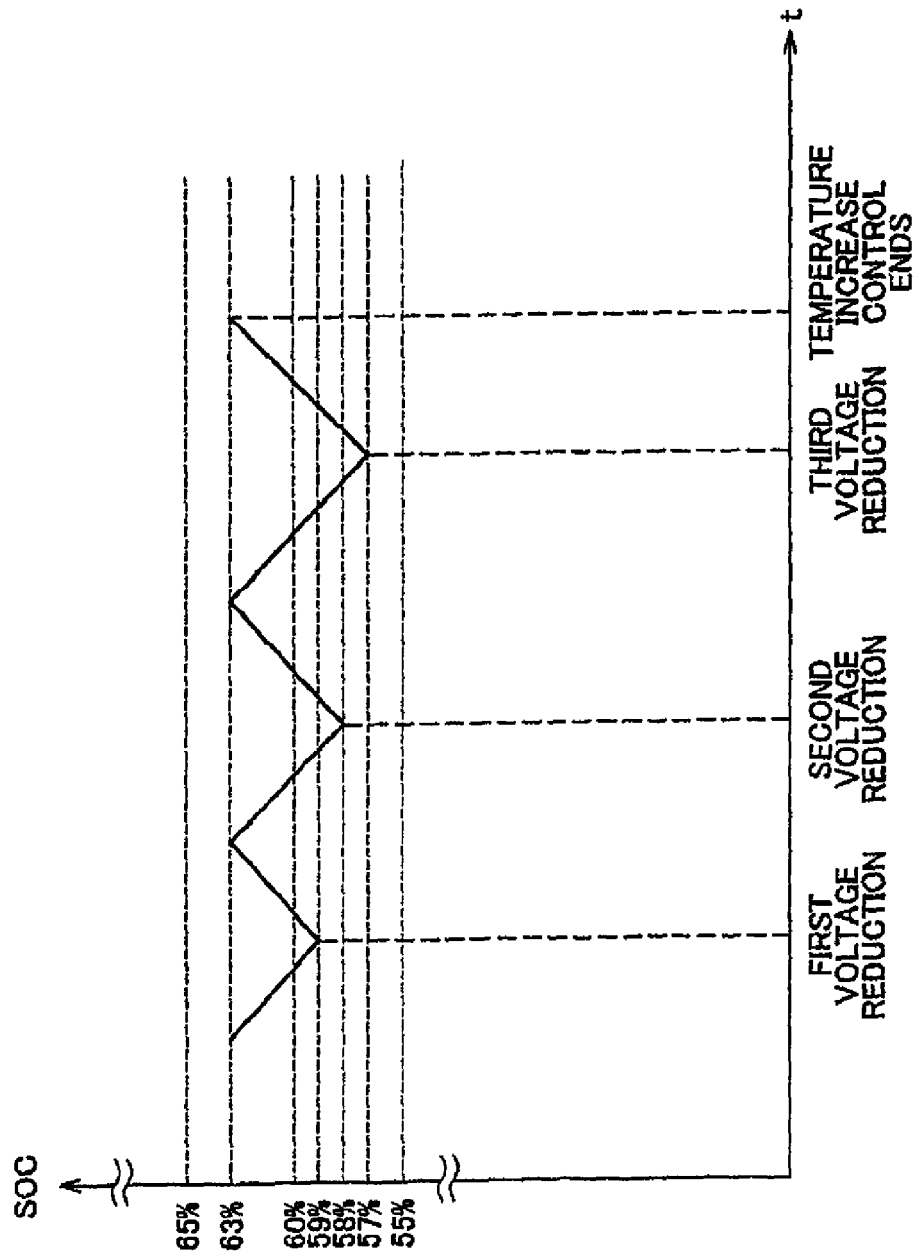
FIG. 3 is a graph of the variation of SOC with time in the temperature increase control.

An example of the temperature increase control is shown in FIG. 3. FIG. 3 is a graph of the variation of SOC with time, showing an example of the temperature increase control, in which the horizontal axis indicates time and the vertical axis indicates SOC. It is assumed that SOC is 63% when the temperature increase control is started (hereinafter referred to as the "initial SOC").

When discharging of the battery pack 10 is started, the temperature increase operation of the battery pack 10 is started. It is assumed that the temperature of the battery pack 10 before the temperature increase operation is started is −20° C. When the battery pack 10 is further discharged, first voltage reduction occurs. When the first voltage reduction occurs, SOC of the battery pack 10 is 59% (hereinafter referred to as the "first reduction SOC").

When the first voltage reduction occurs, the battery pack 10 is immediately switched from the discharge mode to the charge mode. The amount by which the battery pack 10 is to be charged in this case is the value obtained by subtracting the first reduction SOC (59%) from the initial SOC (63%), that is, 4% (ΔSOC). Thus, when the battery pack 10 is switched to the charge mode, SOC of the battery pack 10 returns to 63%.

When SOC of the battery pack 10 returns to 63%, the battery pack 10 is immediately switched from the charge mode to the discharge mode. When the battery pack 10 is further discharged, second voltage reduction occurs. When the second voltage reduction occurs, SOC of the battery pack 10 (hereinafter referred to as the second reduction SOC) is 58%.

When the second voltage reduction occurs, the battery pack 10 is immediately switched from the discharge mode to the charge mode. The amount by which the battery pack 10 is to be charged in this case is the value obtained by subtracting the second reduction SOC (58%) from the initial SOC (63%), that is, 5% (ΔSOC). Thus, when the battery pack 10 is switched to the charge mode, SOC of the battery pack 10 returns to 63%.

When SOC of the battery pack 10 returns to 63%, the battery pack 10 is immediately switched from the charge mode to the discharge mode. When the battery pack 10 is further discharged, third voltage reduction occurs. When the third voltage reduction occurs, SOC of the battery pack 10 (hereinafter referred to as the third reduction SOC) is 57%.

When the third voltage reduction occurs, the battery pack 10 is immediately switched from the discharge mode to the charge mode. The amount by which the battery pack 10 is to be charged in this case is the value obtained by subtracting the third reduction SOC (57%) from the initial SOC (63%), that is, 6% (ΔSOC). Thus, when the battery pack 10 is switched to the charge mode, SOC of the battery pack 10 returns to 63%. In this way, the temperature is increased above −10° C.

Figure 4:
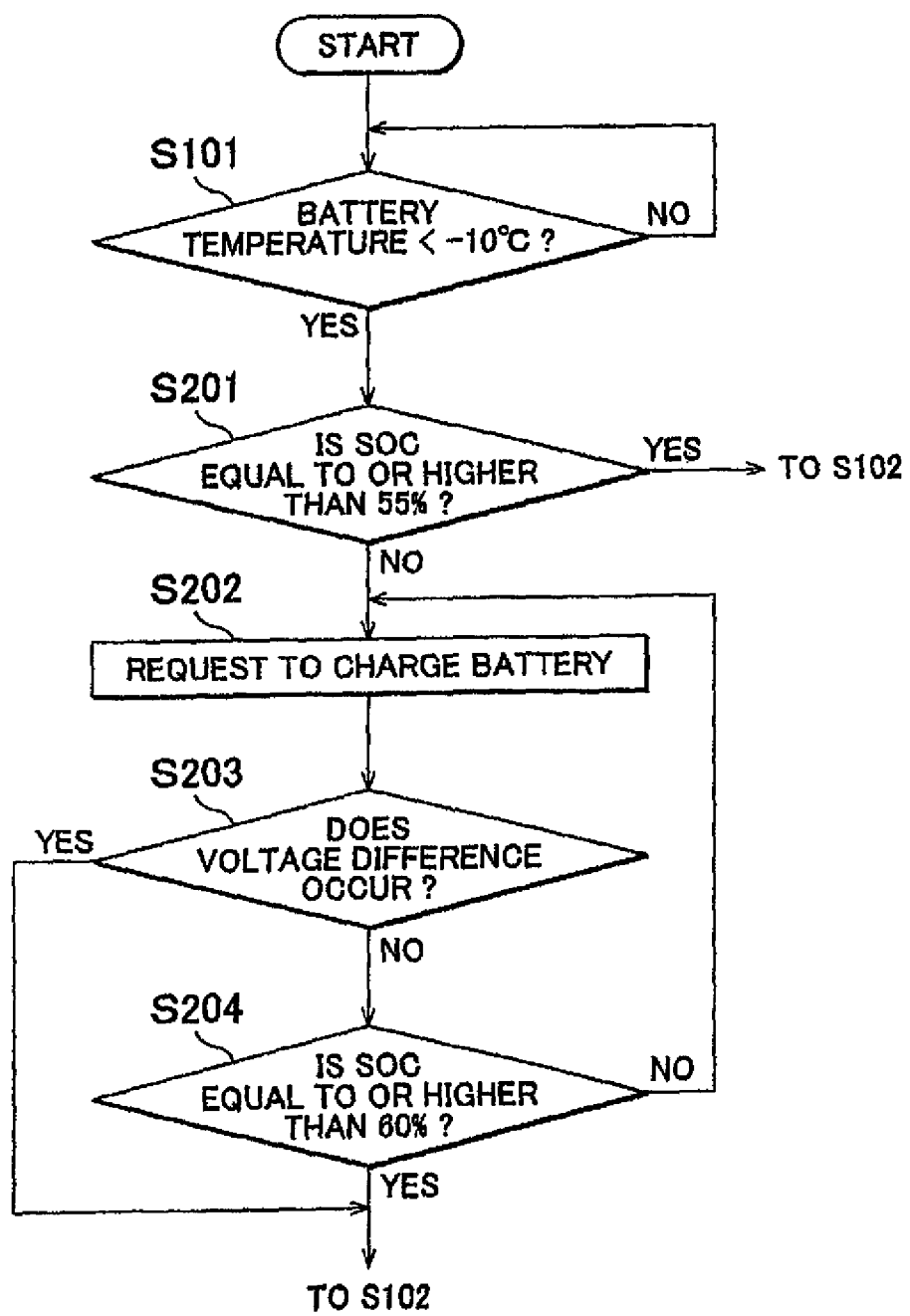
FIG. 4 is a flow chart of temperature increase control according to a second embodiment.

Next, referring to FIG. 4, a second embodiment will be described. FIG. 4 is a flow chart showing a procedure of the temperature increase control. The circuit configuration of the charge control device is the same as that of the first embodiment. In this embodiment, the following temperature increase control is interposed between steps S101 and S102 of the first embodiment.

When it is determined in step S101 that the temperature of the battery pack 10 is lower than −10° C., the process proceeds to step S201. In step S201, it is determined whether SOC of the battery pack 10 is equal to or higher than 55%. When it is determined that SOC of the battery pack 10 is equal to or higher than 55%, the process proceeds to step S102 of the first embodiment.

When it is determined that SOC of the battery pack 10 is lower than 55%, the process proceeds to step S202. In step S202, it is requested to charge the battery pack 10. The amount of charging of the battery pack 10 is monitored by the controller 50. When it is requested to charge the battery pack 10 in step S202, the process proceeds to step S203.

In step S203, the difference in the block voltage is calculated based on the signals output from the voltage sensors 40A and 40B, and it is determined whether the difference in the block voltage is greater than 0.2V. When the difference in the block voltage is greater than 0.2 V, the discharging of the battery pack 10 is stopped and the process proceeds to step S102 of the first embodiment. When the voltage difference is equal to or lower than 0.2 V, the process proceeds to step S204.

In step S204, it is determined whether SOC of the battery pack 10 is equal to or higher than 60%. When it is determined that SOC of the battery pack 10 is equal to or higher than 60%, the process proceeds to step S102 of the first embodiment. When it is determined that SOC of the battery pack 10 is lower than 60%, the process returns to step S202. When the temperature of the battery pack 10 becomes higher than −10° C. during the above-described process from step S201 to step S204, the temperature increase control may be immediately stopped.

The charging and discharging of the battery pack 10 are switched to and from based on the amount of the difference in the voltage values of the blocks in this way, so that it is possible to increase the temperature of the battery pack 10 while suppressing deterioration of the battery.

In this embodiment, SOC of the battery pack 10 is increased to the target electricity storage amount (60%) that is the target value of the amount of electricity stored in the battery pack 10, and then the temperature increase control of the first embodiment is performed. In this way, it is possible to perform the temperature increase control around the target electricity storage amount (60%). The target electricity storage amount and the predetermined range may be appropriately changed in accordance with conditions such as the type of the battery.

Figure 5:
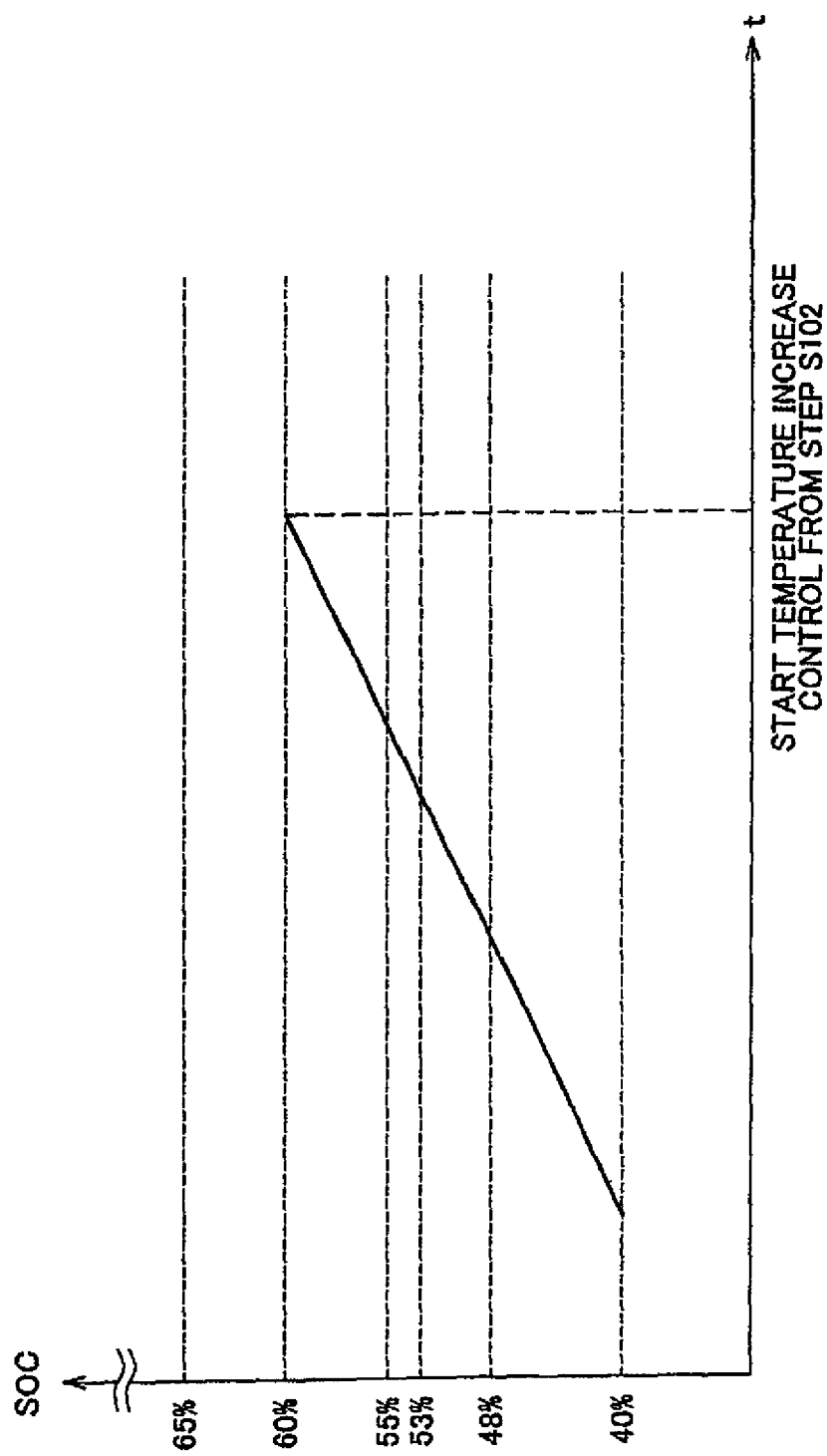
FIG. 5 is a graph of the variation of SOC with time in the temperature increase control according to the second embodiment.
Figure 6:
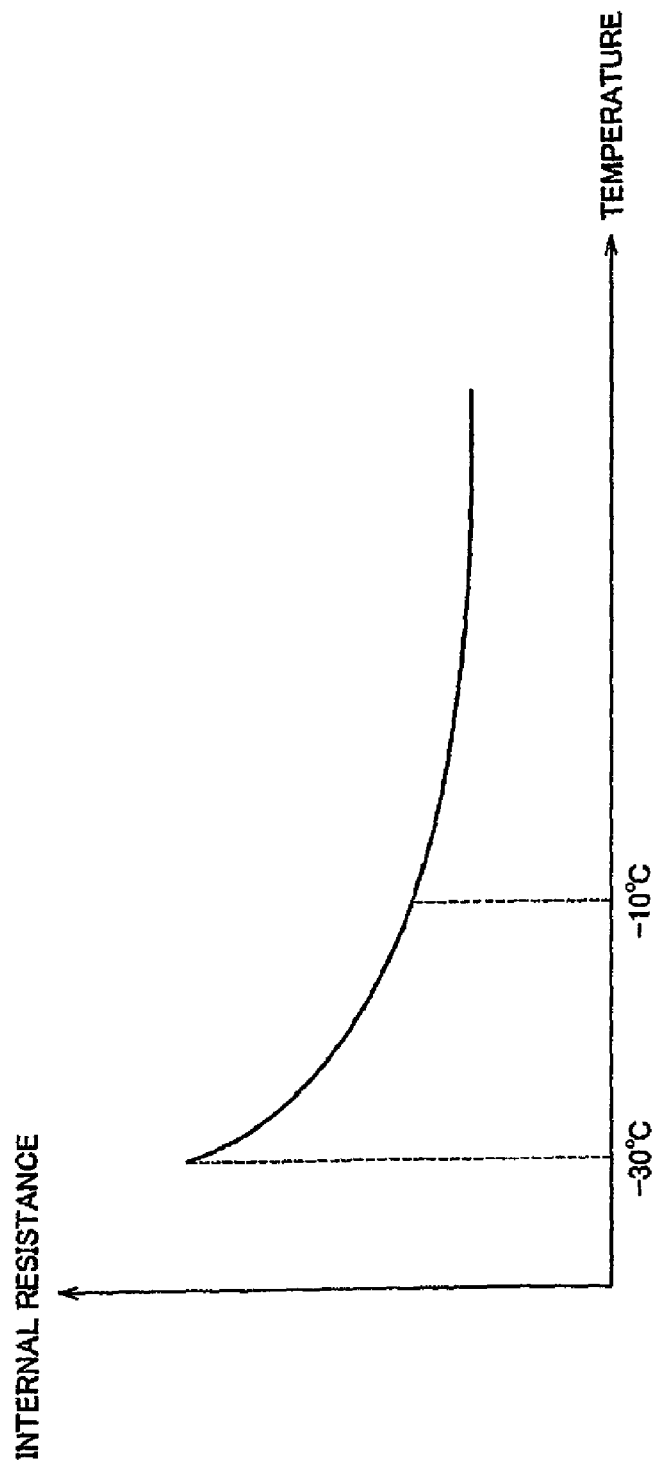
FIG. 6 is a graph showing relation between temperature and internal resistance of a battery.

An example of the temperature increase control is shown in FIG. 5. FIG. 5 is a graph of the variation of SOC with time, showing an example of the temperature increase control, in which the horizontal axis indicates time and the vertical axis indicates SOC. SOC is 40% when the temperature increase control is started (hereinafter referred to as the "initial SOC").

When the temperature increase control for the battery pack 10 is started, the steps S202 to S204 are repeatedly executed until SOC of the battery pack 10 increases to 60%. Thus, it is possible to perform the temperature increase control similar to the temperature increase control of the first embodiment after increasing the SOC of the battery pack 10 into a predetermined range (55 to 65%), the center of which is the target electricity storage amount (60%).

Next, some modifications will be described. In the above-described embodiments 1 and 2, the battery pack 10 is switched between the charge mode and the discharge mode depending on whether the block voltage difference is greater than the predetermined value (0.2 V). However, the switching between the charge mode and the discharge mode may be performed depending on whether the block voltage difference increases. For example, in the first embodiment, a configuration may be adopted in which the difference in the block voltage (hereinafter referred to as the "reference difference") immediately after it is requested to discharge the battery pack 10 (step S103) is stored in the memory 50A, and when the difference in the block voltage measured thereafter is greater than the reference difference, the battery pack 10 is switched from the discharge mode to the charge mode. In this way, even when there is an error in the voltage sensor(s) 40, it is possible to reliably detect voltage reduction.

A configuration may be adopted in which when the battery pack 10 is in the charge mode of the first embodiment, the difference in the block voltage between the battery block 12A and the battery block 12B is detected, and when the difference between the block voltages is greater than 0.2 V, the battery pack 10 is switched to the discharge mode.

In the second embodiment, when SOC of the battery pack 10 before the temperature increase control is started is higher than 65%, the charging and discharging of the battery pack 10 may be controlled as described below. First, the battery pack 10 is set in the discharge mode and a discharge is conducted. When the difference between the block voltages becomes greater than 0.2 V after the discharge, the battery pack 10 is switched to the charge mode (the amount of charge is set less than the amount of discharge). By repeatedly performing this switching of the modes, SOC of the battery pack 10 is reduced into the range of approximately 55 to 60%. That is, after SOC of the battery pack 10 is varied so as to fall within the range of 55 to 60%, the temperature increase control of the first embodiment is performed. In this way, it is possible to achieve the effects similar to those of the second embodiment.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A charge control device that controls charging and discharging of a storage battery in which a plurality of storage blocks, each including a plurality of storage elements, are connected in series, the charge control device comprising
    a first voltage sensor and a second voltage sensor that detect a voltage value of a first storage block and a voltage value of a second storage block, respectively, the first and second storage blocks included in the plurality of storage blocks,
    wherein when performing a charge and discharge process in which a charge mode, in which the storage battery is charged, and a discharge mode, in which the storage battery is discharged, are alternately selected, one of the charge mode and the discharge mode is switched to the other mode based on an amount of difference between the voltage values detected by the first and second voltage sensors, and
    wherein in response to a temperature of the storage battery being less than or equal to a predetermined temperature, the charge and discharge process is performed to raise the temperature of the storage battery and the charge and discharge process is performed until the temperature of the storage battery is greater than the predetermined temperature.

2. The charge control device according to claim 1, wherein, in the charge and discharge process, when the difference between the voltage values detected by the first and second voltage sensors is greater than a predetermined value, the one of the charge mode and the discharge mode is switched to said the other mode.

3. The charge control device according to claim 1, wherein, in the charge and discharge process, when the difference between the voltage values detected by the first and second voltage sensors increases, the one of the charge mode and the discharge mode is switched to said the other mode.

4. The charge control device according to claim 1, wherein the one of the charge mode and the discharge mode is the discharge mode and said the other mode is the charge mode.

5. The charge control device according to claim 4, wherein, in the charge and discharge process, when in the charge mode, the storage battery is charged by an amount corresponding to an amount of electricity discharged from the storage battery when in the discharge mode.

6. The charge control device according to claim 1, wherein the charge and discharge process is performed when an amount of electricity stored in the storage battery is within a predetermined range, the center of which is a target electricity storage amount that is a target value of the amount of electricity stored in the storage battery.

7. The charge control device according to claim 6, wherein, before performing the charge and discharge process, when the amount of electricity stored in the storage battery is out of the predetermined range, the amount of electricity stored in the storage battery is varied so as to fall within the predetermined range by charging or discharging the storage battery.

8. The charge control device according to claim 1, wherein the first and second storage blocks are next to each other.

9. The charge control device according to claim 1, wherein the storage battery is a secondary battery.

10. A vehicle equipped with the charge control device according to claim 1.

11. A storage battery control method, in which charging and discharging of a storage battery in which a plurality of storage blocks, each including a plurality of storage elements, are connected in series are controlled, the storage battery control method comprising:
    detecting a voltage value of a first storage block included in the plurality of storage blocks;
    detecting a voltage value of a second storage block included in the plurality of storage blocks; and
    performing a charge and discharge process in which a charge mode, in which the storage battery is charged, and a discharge mode, in which the storage battery is discharged, are alternately selected,
    wherein one of the charge mode and the discharge mode is switched to the other mode based on an amount of difference between the voltage values of the first and second storage blocks, and
    wherein in response to a temperature of the storage battery being is less than or equal to a predetermined temperature, the charge and discharge process is performed to raise the temperature of the storage battery and the charge and discharge process is performed until the temperature of the storage battery is greater than the predetermined temperature.

12. The storage battery control method according to claim 11, wherein, in the charge and discharge process, when the difference between the voltage values of the first and second storage blocks is greater than a predetermined value, the one of the charge mode and the discharge mode is switched to said the other mode.

13. The storage battery control method according to claim 11, wherein, in the charge and discharge process, when the difference between the voltage values of the first and second storage blocks increases, the one of the charge mode and the discharge mode is switched to said the other mode.

14. The storage battery control method according to claim 11, wherein the one of the charge mode and the discharge mode is the discharge mode and said the other mode is the charge mode.

15. The storage battery control method according to claim 14, wherein, in the charge and discharge process, when in the charge mode, the storage battery is charged by an amount corresponding to an amount of electricity discharged from the storage battery when in the discharge mode.

16. The storage battery control method according to claim 11, wherein the charge and discharge process is performed when an amount of electricity stored in the storage battery is within a predetermined range, the center of which is a target electricity storage amount that is a target value of the amount of electricity stored in the storage battery.

17. The storage battery control method according to claim 16, further comprising, before performing the charge and discharge process, when the amount of electricity stored in the storage battery is out of the predetermined range, varying the amount of electricity stored in the storage battery so as to fall within the predetermined range by charging or discharging the storage battery.

18. The storage battery control method according to claim 11, wherein the first and second storage blocks are next to each other.

* * * * *